United States Patent [19]

Guran

[11] 3,968,343
[45] July 6, 1976

[54] FUSER ROLL TEMPERATURE REGULATOR PROBE

[75] Inventor: Zenon Guran, Rochester, N.Y.

[73] Assignee: Xerox Corporation, Stamford, Conn.

[22] Filed: Oct. 29, 1974

[21] Appl. No.: 518,552

[52] U.S. Cl. .............................. 219/216; 219/388; 219/471
[51] Int. Cl.² ..................... H05B 1/00; G03G 15/00
[58] Field of Search .................... 219/216, 469–471, 219/244, 388; 338/22, 23, 25, 28; 432/60, 228

[56] References Cited
UNITED STATES PATENTS

| | | |
|---|---|---|
| 3,123,790 | 3/1964 | Tyler .................................... 338/28 |
| 3,181,557 | 5/1965 | Lannan, Jr. ....................... 338/23 X |
| 3,417,226 | 12/1968 | Thomiszer ......................... 219/216 |
| 3,570,312 | 3/1971 | Kreith .............................. 338/28 X |
| 3,754,201 | 8/1973 | Adams ................................. 338/28 |
| 3,809,855 | 5/1974 | Neal ................................... 219/471 |

OTHER PUBLICATIONS

D. N. Neal & G. C. Greuling *Moving Surface Temperature Sensor* "IBM Technical Disclosure Bulletin," vol. 14, No. 6, Nov. 1971.

*Primary Examiner*—C. L. Albritton

[57] ABSTRACT

Contact fuser apparatus comprising a temperature sensing device including a thermally conductive cap member which is constructed in a manner to insure proper positioning of the temperature sensing device relative to the heated member of said contact fuser apparatus.

6 Claims, 3 Drawing Figures

FUSER ROLL TEMPERATURE REGULATOR PROBE

BACKGROUND OF THE INVENTION

This invention relates in general to xerographic reproducing apparatus and more particularly to a contact fuser and temperature sensing device therefor.

In the process of Xerography, latent electrostatic images are formed on a support member, for example, plain paper, with the subsequent rendering of the latent images visible by the application of electroscopic marking particles, commonly referred to as toner. The toner images can be fixed directly upon the support member on which they are formed or they can be transferred to another support member with subsequent fixing of the images thereto.

Fixing of toner images can be accomplished by various methods one of which is by the employment of thermal energy. In order to permanently fix or fuse toner images onto a support member by means of thermal energy it is necessary to elevate the temperature of the toner material to a point at which the constituents of the toner coalesce and become tacky. This action causes the toner to be absorbed to some extent into the fibers of the paper. Thereafter as the toner cools, solidification of the toner material occurs causing it to be firmly bonded to the support member. In the process of Xerography, the use of thermal energy for fixing toner images is old and well known.

One approach to thermal fixing or fusing of toner images onto a support member is to pass the support member between a pair of fuser roll members one roll of which is heated. The support member is passed through the nip formed by the fusing roll members with the toner images contacting the heated roll. In order to elevate the temperature of the toner material for proper fusing it is necessary to control the surface temperature of the heated roll member.

A common means of controlling the temperature of the heated fuser roll member is to provide a contact temperature sensing device which frictionally engages the surface of the heated fuser roll member. In order to accurately control the fuser roll temperature with a contact sensing device it is necessary to insure that the sensing element is properly positioned relative to the surface of the fuser roll.

Accordingly, the primary object of this invention is to provide a new and improved fuser apparatus for a xerographic reproducing machine.

Another object of this invention is to provide a new and improved temperature sensing device for use in conjunction with a contact fuser apparatus utilized in a xerographic reproducing machine.

Yet another object of this invention is to provide a temperature sensing device having a thermally conductive cap member containing temperature sensing elements which cap member is constructed in a manner to insure proper positioning of the temperature sensing device relative to the surface whose temperature is to be controlled.

BRIEF SUMMARY OF THE INVENTION

Briefly, the above-cited objects are accomplished by the provision of temperature sensing device comprising a thermally conductive cap member provided with a generally planar surface containing an outwardly extending protrusion delineating a recessed area wherein a pair of temperature sensitive elements are received. The cap is pivotally supported relative to a heated fuser roll structure such that the outwardly extending protrusion contacts the heated fuser roll structure thereby insuring that the temperature sensitive elements are adjacent the surface of the heated fuser roll regardless of angular orientation of the cap member relative to the fuser roll structure.

Further objects and advantages of the present invention will become apparent in view of the detailed description to follow when read in conjunction with the accompanying drawings.

DETAILED DESCRIPTION OF THE DRAWINGS

DETAILED DESCRIPTION OF THE PREFERRED EMBODIMENT

Figure 1:
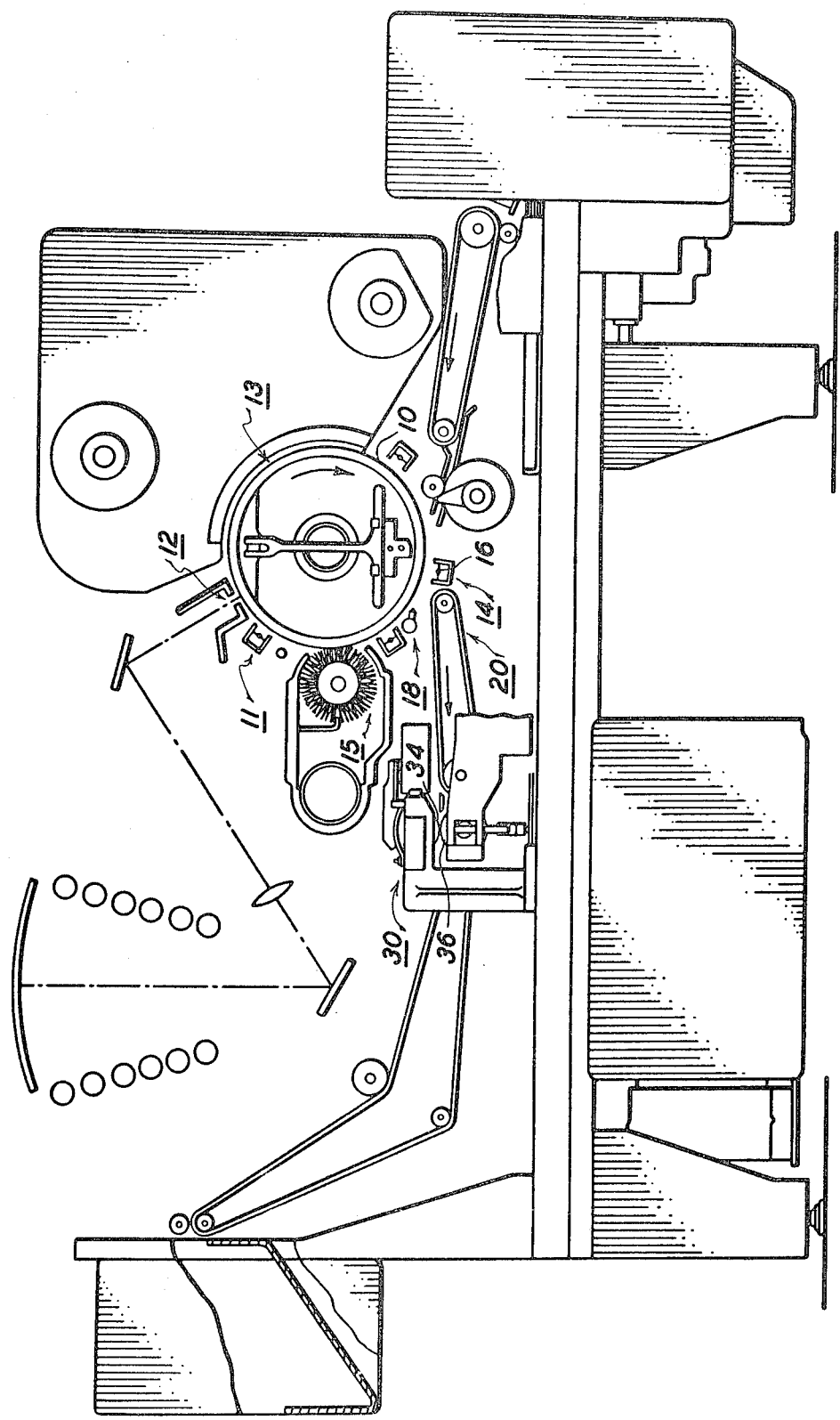
FIG. 1 is a front elevational view of an automatic xerographic reproducing machine utilizing the present invention.

Referring now to FIG. 1, there is shown an embodiment of the subject invention in a suitable environment such as an automatic xerographic reproducing machine having a xerographic plate including a photoconductive layer or light-receiving surface on a conductive backing and formed in the shape of a drum 10 which is mounted on a shaft journaled in a frame to rotate in the direction indicated by the arrow to cause the drum surface sequentially to pass a plurality of xerographic processing stations.

For the purpose of the present disclosure, the several xerographic processing stations in the path of movement of the drum surface may be described functionally, as follows:

A charging station 11, at which a uniform electrostatic charge is deposited on the photoconductive layer of the xerographic drum;

An exposure station 12, at which a light or radiation pattern of copy to be reproduced is projected onto the drum surface to dissipate the drum charge in the exposed areas thereof thereby forming a latent electrostatic image of the copy to be reproduced;

A developing station 13, at which xerographic developing material, including toner particles having an electrostatic charge opposite to that of the electrostatic latent image, are cascaded over the drum surface, whereby the toner particles adhere to the electrostatic latent image to form a xerographic powder image in the configuration of the copy being reproduced;

A transfer station 14, at which the xerographic powder image is electrostatically transferred from the drum surface to a transfer or support material; and A drum cleaning and discharge station 15, at which the drum surface is brushed to remove residual toner particles remaining thereon after image transfer, and at which the drum surface is exposed to a relatively bright light source to effect substantially complete discharge of any residual electrostatic charge remaining thereon.

It is believed that the foregoing description is sufficient for the purposes of this application to illustrate the general operation of a xerographic reproducing apparatus utilizing an improved temperature sensing device constructed in accordance with the invention. For further details concerning the specific construction of the xerographic apparatus shown, reference is made to U.S. Pat. No. 3,301,126 in the name of Robert F. Osborne, et al. entitled Reproducing Apparatus.

At the transfer station 14, the transfer of the xerographic powder images from the drum surface to the sheets of support material is effected by means of a corona transfer device 16 that is located at or immediately after the line of contact between the support material and the rotating drum. In operation, the electrostatic field created by the corona transfer device is effective to tack the support material electrostatically to the drum surface, whereby the support material moves synchronously with the drum while in contact therewith. Simultaneously with the tacking action, the electrostatic field is effective to attract the toner particles comprising the xerographic powder image from the drum surface and causes them to adhere electrostatically to the surface of the support material.

Figure 2:
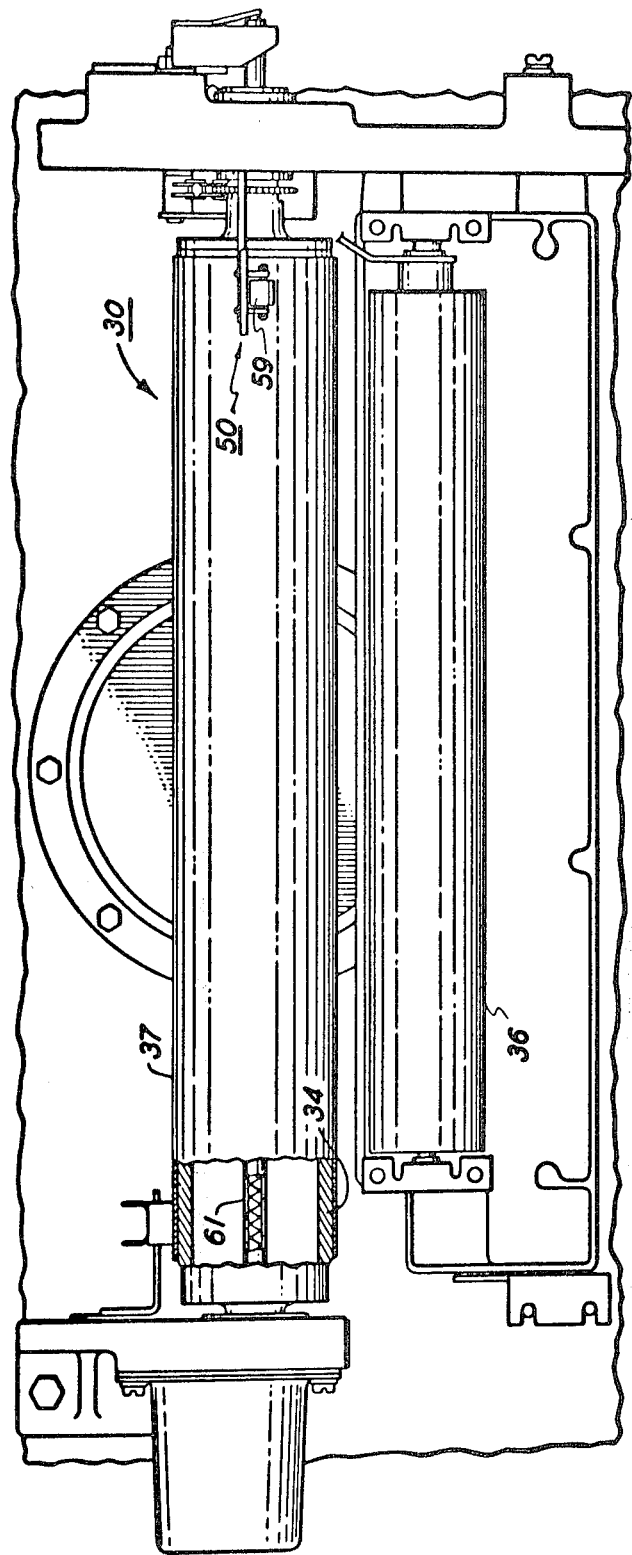
FIG. 2 is an enlarged elevational view of a fuser apparatus forming a part of the machine disclosed in FIG. 1.

Immediately subsequent to the image transfer station, there is positioned a stripping apparatus 18 for removing the sheets of support material from the drum surface. The sheet stripping apparatus is adapted to strip the leading edge of the support material from the drum surface and to direct it onto an endless conveyor 20 which carries the sheet material to a fixing heated pressure roll apparatus 30. The sheet material is passed between a centrally heated top roll or cylinder structure 34 and a displaceable lower roll structure 36 to permanently fix or fuse the image by a combination of heat and pressure the toner images being contacted by the top roll structure. The centrally heated pressure roll has an outer cover 37 made of Teflon and is continuously wiped with silicone oil by wick to prevent image offset. For further details of the specific fusing apparatus shown in FIGS. 1 and 2, reference is made in U.S. Pat. No. 3,291,466.

Figure 3:
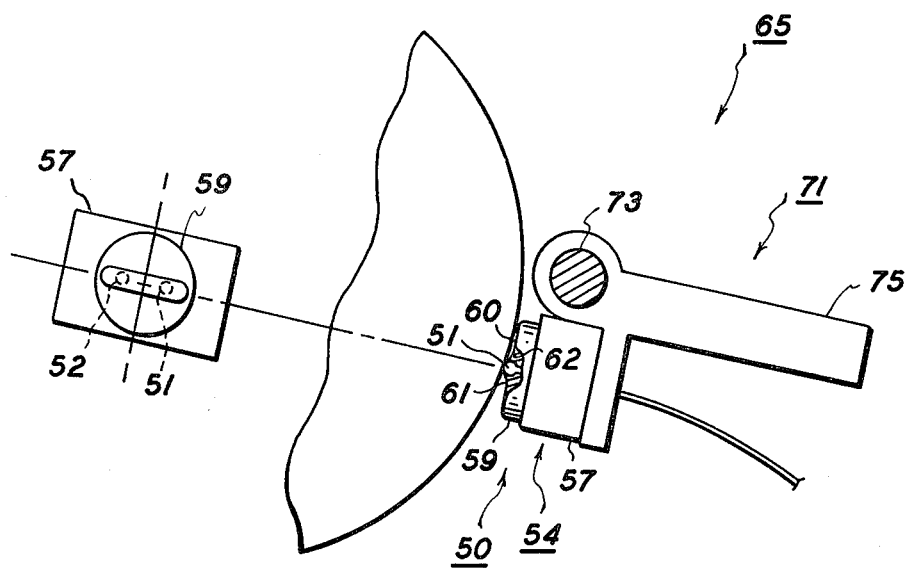
FIG. 3 is a side view of a temperature sensing apparatus utilized in conjunction with the fuser apparatus illustrated in FIG. 2.

As illustrated in FIG. 3, a contact temperature sensing device 50 comprises two temperature responsive resistant elements 51 and 52 which may be of any commercially available type glass bead thermistors, such as that available from Fenwall Electronics, Framingham, Mass. or from Victory Engineering (Veco), Springfield, New Jersey.

The temperature responsive resistance elements or beads 51 and 52 are secured in a bead support assembly 54. The bead support assembly 54 comprises a box-like housing 57 which is fabricated of thermally insulative material and a cup-shaped cap member 59 made of thermally conductive material such as beryllium copper. The cap member 59 has a generally planar surface 60 with an outwardly protruding area 61 forming a recessed area 62 in the back of the surface 60. The beads 51 and 52 are preferably epoxied in the recessed area 62 to insure good thermal contact therewith. It will be noted from a consideration of FIG. 3 that the outwardly protruding area 61 rides in contact with the surface of the fuser roll 34. Signals generated by the beads 51 and 52 by virtue of the variation in temperature of the fuser roll are employed for controlling the temperature of the fuser roll by an electrical control circuit coupled to resistance heating element 63 in a manner disclosed, by way of example, in U.S. Pat. No. 3,291,466 which is incorporated herein by reference. The bead support assembly 54 is supported by a pivotal support member 65 which is pivotally supported from the machine frame on a shaft 73. The support member 65 has an elongated portion 71 having a weighted portion 75 which results in moment forces acting clockwise about the shaft 73. In accordance with the present such rotational forces effect intimate contact between the fuser roll 34 and the protruding area 61 regardless of the angular orientation of the box-like housing 57 to thereby effect proper positioning of the sensing device 50 thereby optimizing the thermal transfer from the fuser roll to the bead elements 51 and 52.

While the invention has been described with reference to the structure disclosed herein, it is not confined to the detail set forth and this application is intended to cover such modifications on changes as may come within the purposes of the improvements or the scope of the following claims.

What is claimed is:

1. Apparatus for sensing surface temperatures of a heated roll utilized for fusing toner images, said apparatus comprising:

temperature responsive means;

a thermally conductive cap member having a generally planar surface with an area protruding outwardly therefrom to form a recess for receiving said temperature responsive means;

a first support means for supporting said thermally conductive cap member, said first support means being thermally insulative, said temperature responsive means being recieved in said recess; and second support means carrying said first support means, said second support means being pivotally mounted by a pin member whereby said protruding area can be biased into contact with the surface of said heated roll.

2. Fuser apparatus comprising a pair of nip-forming members at least one member of which is heated and contacts toner images adhered to support members moved through said nip, said fuser apparatus comprising:

temperature responsive means;

a thermally conductive member having a generally planar surface with an area protruding in the direction of said heated one of said nip-forming member and forming a recess for receiving said temperature responsive means;

means for pivotably supporting said thermally conductive member adjacent the heated one of said nip-forming members, said temperature responsive means being received in said recess; and means for effecting continuous frictional engagement between said protruding area and said heated one of said members.

3. Apparatus according to claim 2, wherein said nip members comprise a pair of roll structures and said heated roll sturucture contains a friction reducing surface.

4. Apparatus according to claim 3, wherein said pivotal support means comprises integral bias means for effecting said continuous frictional contact.

5. Apparatus according to claim 4, wherein said thermally conductive member comprises a cup-shaped cap member.

6. Apparatus according to claim 5, wherein said temperature responsive means comprises a pair of glass bead thermistors epoxied in said recess.

* * * * *